8629X
J. Ross.
Thrashing Mach.
Patented Feb. 6, 1835.
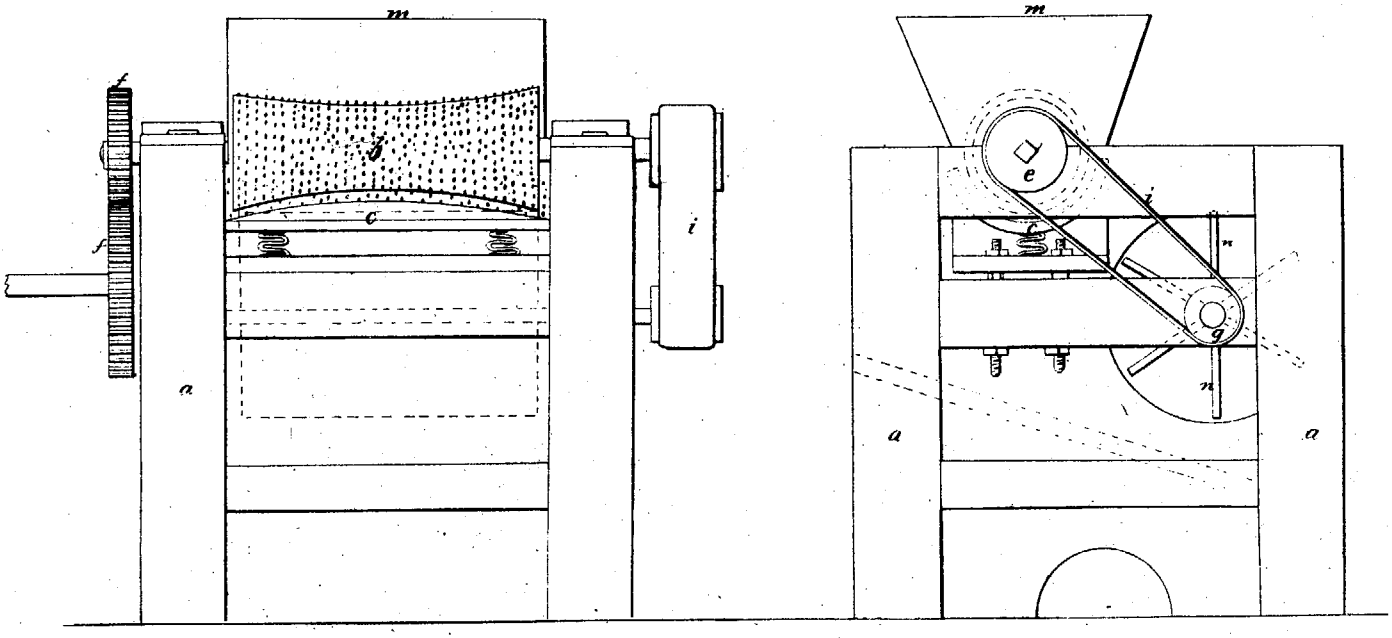

Joseph Ross of Boundbrook New Jersey

Letters Patent.

The Schedule referred to in these Letters Patent and making part of the same, contain-
ing a description in the words of the said Joseph Ross himself of his improvement
in a Machine patented by himself on the 12th of April 1833. for the purpose
of shelling Corn by which improvement it is adapted to the thrashing of grain.

To all whom it may concern. Be it known that I, Joseph Ross of Bound-
brook in the County of Somerset and State of New Jersey did on the 12th day of
April 1833. Obtain Letters Patent of the United States for a machine for shel-
ling corn. and that I have since discovered that by certain improvements or
variations thereon. I can adapt the same to the thrashing of grain. my said
improvement however being capable of being used as a thrashing machine by
applying the cylindrical body and concave herein described to any suitable -
frame other than that used with my shelling machine. the only motive for com-
bining the two being the saving of expense.

I make that part which is usually denominated the cylinder in thrashing
machines smaller in the middle than at the two ends. so that instead of being a cylin-
der it is in fact formed by the union of two truncated cones at their smaller ends
the difference of diameter between the middle and ends may be about one
inch. I prefer not to make the difference greater as I can then use a con-
cave which is straight longitudinally whilst if the cylindrical part was made
much smaller in the middle: it would be necessary to make the concave conform
thereto, by giving it a rise in the centre, but I usually make the teeth driv-
en into the cylinder to vary in length, so that their outer ends will in revolving
pass each at the same distance from the concave. I drive teeth into the cylin
drical Body which teeth project from an inch to an inch and a half, and also
drive similar teeth into the concave, these may be of square three eighths iron
I do not drive them straight but incline them in both in such a way as shall
tend to prevent their breaking the straw then those separating them readily
therefrom. I usually cover the cylinder and concave with sheet iron as this tends
to render them the more durable. In the frame of my shelling Machine the cylin-
der and concave may be substituted for the shelling apparatus. so that the

[illegible]

8629X one or the other may be used at pleasure or I place this cylinder and concave in a suitable frame without reference to the shelling machine. in either case a proper feeding table or any other well known contrivance for that purpose may be used. The only thing which I claim as new is the form given to what is usually denominated the cylinder by making it smaller at the centre than at the ends as herein described. the effect of which it has been experimentally proved is to prevent that annoyance from from the current of wind and dust produced in other machines for thrashing grain. Although I have spoken of the revolving body as formed by the union of two truncated cones. the effect will be similar if instead of using the double cone as described, the cylinder be made concave in a regular curve reducing the diameter in the middle so that it shall be an inch or upwards less there than at the two ends. In testimony that the foregoing is a true description of my invention I have hereunto set my hand Jany 23<sup></sup>d 1835.

Joseph Ross.

Exd. Witnesses
W.J.E. Jos Andrews
Charles E Russell

[illegible] drawing in Portfolio (690 words)